US010605016B2

(12) United States Patent (10) Patent No.: US 10,605,016 B2
Thiemann (45) Date of Patent: Mar. 31, 2020

(54) TONG ASSEMBLY

(71) Applicant: Weatherford Technology Holdings, LLC, Houston, TX (US)

(72) Inventor: Bjoern Thiemann, Burgwedel (DE)

(73) Assignee: Weatherford Technology Holdings, LLC, Houston, TX (US)

( * ) Notice: Subject to any disclaimer, the term of this patent is extended or adjusted under 35 U.S.C. 154(b) by 167 days.

(21) Appl. No.: 15/815,590

(22) Filed: Nov. 16, 2017

(65) Prior Publication Data

US 2019/0145195 A1 May 16, 2019

(51) Int. Cl.
*G01L 5/00* (2006.01)
*E21B 19/16* (2006.01)
*G01L 5/24* (2006.01)

(52) U.S. Cl.
CPC .......... *E21B 19/164* (2013.01); *E21B 19/161* (2013.01); *E21B 19/166* (2013.01); *G01L 5/0042* (2013.01); *G01L 5/24* (2013.01)

(58) Field of Classification Search
CPC .... E21B 19/165; E21B 19/166; E21B 19/161; E21B 19/164; G01L 5/24; G01L 5/0042; G01L 5/009
See application file for complete search history.

(56) References Cited

U.S. PATENT DOCUMENTS

| | | | |
|---|---|---|---|
| 4,649,777 A * | 3/1987 | Buck | E21B 19/161 81/57.19 |
| 5,245,877 A | 9/1993 | Ruark | |
| 5,542,318 A | 8/1996 | Wesch, Jr. | |
| 5,845,549 A * | 12/1998 | Bouligny | E21B 19/164 81/57.33 |
| 6,082,224 A * | 7/2000 | McDaniels | B25B 1/241 81/57.15 |
| 6,263,763 B1 * | 7/2001 | Feigel, Jr. | E21B 19/164 81/57.19 |
| 7,188,547 B1 * | 3/2007 | West | E21B 19/161 81/57.16 |
| 9,488,017 B2 | 11/2016 | Angelle et al. | |
| 9,657,539 B2 * | 5/2017 | Gupta | E21B 19/164 |

(Continued)

FOREIGN PATENT DOCUMENTS

| | | |
|---|---|---|
| WO | 2004079148 A2 | 9/2004 |
| WO | 2016191067 A1 | 12/2016 |
| WO | 2017031441 A1 | 2/2017 |

OTHER PUBLICATIONS

EPO Extended European Search Report dated May 27, 2019, for European Application No. 18204251.5.

(Continued)

*Primary Examiner* — Freddie Kirkland, III
(74) *Attorney, Agent, or Firm* — Patterson + Sheridan, LLP

(57) ABSTRACT

A tubular handling apparatus includes a power tong; a backup tong; and a load transfer assembly connected between the power tong and the backup tong. The load transfer assembly includes a first link having a first load cell positioned to measure a first force exerted on the first link; and a second link having a second load cell positioned to measure a second force exerted on the second link. The tubular handling apparatus may also include a tong control assembly configured to select the first load cell for use in a tubular makeup operation and to select the second load cell for use in a tubular breakout operation.

18 Claims, 4 Drawing Sheets

(56) References Cited

U.S. PATENT DOCUMENTS

| | | |
|---|---|---|
| 10,337,264 B2* | 7/2019 | Rothe .................... E21B 19/161 |
| 2004/0195555 A1 | 10/2004 | Bangert et al. |
| 2011/0030512 A1* | 2/2011 | Begnaud, Jr. ......... E21B 19/164 |
| | | 81/57.34 |
| 2012/0323500 A1 | 12/2012 | Prefontaine |
| 2015/0101826 A1* | 4/2015 | Gupta .................... E21B 19/164 |
| | | 166/377 |
| 2018/0171729 A1* | 6/2018 | Wood .................... E21B 19/166 |

OTHER PUBLICATIONS

Australian Examination Report dated Jun. 26, 2019, for Australian Patent Application No. 2018256644.
Australian Examination Report dated Dec. 9, 2019, for Australian Patent Application No. 2018256644.

* cited by examiner

TONG ASSEMBLY

BACKGROUND OF THE DISCLOSURE

Field of the Disclosure

The present disclosure generally relates to methods and apparatus for making up and breaking out tubular connections. More particularly, embodiments of the present disclosure relate to a tong assembly having two load cells for use in making up or breaking out tubular connections.

Description of the Related Art

Construction of oil or gas wells usually requires making long tubular strings that makeup casing, risers, drill pipe or other tubing. Due to the length of these strings, sections or stands of tubulars are progressively added to or removed from the tubular strings as they are lowered or raised from a drilling platform. A tong assembly is commonly used to makeup or breakout joints in the tubular strings.

It is desirable that the tong assembly applies a predetermined torque to the joint to prevent the joint from being too loose or too tight. Torque applied to the tubular has been monitored by measuring a force of compression or tension exerted on a component of a tong assembly and converting the measured force to torque. However, movements of the tong assembly during makeup may cause misalignment of the force measuring sensors, thus, compromising accuracy of the force measurement. Additionally, accuracy of the torque measurement converted from a force measurement is also susceptible to size variations of the tubulars.

Therefore, there is a need for a tong assembly with improved torque measurement.

SUMMARY OF THE DISCLOSURE

The present disclosure generally relates to a tong assembly for making up and breaking out a tubular connection such as a connection between two tubulars in a tubular string.

In one embodiment, a tubular handling apparatus includes a power tong; a backup tong; and a load transfer assembly connected between the power tong and the backup tong. The load transfer assembly includes a first link having a first load cell positioned to measure a first force exerted on the first link; and a second link having a second load cell positioned to measure a second force exerted on the second link. The tubular handling apparatus may also include a tong control assembly configured to select the first load cell for use in a tubular makeup operation and to select the second load cell for use in a tubular breakout operation.

In another embodiment, a method of measuring a torque applied between a first tubular and a second tubular includes gripping the first tubular using a power tong; gripping the second tubular using a backup tong; applying a torque to the first tubular using a power tong; measuring the torque using a first load cell if the first tubular is being connected to the second tubular; and measuring the torque using a second load cell if the first tubular is being disconnected from the second tubular.

In another embodiment, a method of measuring a torque applied between a first tubular and a second tubular includes gripping the first tubular using a power tong; gripping the second tubular using a backup tong; applying a torque to the first tubular using a power tong; measuring a tension force using a first load cell; determining the torque applied using the measured tension force; measuring a compressive force using a second load cell; and verifying the torque applied using the compressive force.

In another embodiment, a method of measuring a torque applied by a tong assembly includes applying a clockwise torque using a power tong of the tong assembly; measuring a first tension force using a first load cell; determining the clockwise torque using the first tension force; applying a counterclockwise torque using the power tong; measuring a second tension force using a first load cell; and determining the counterclockwise torque using the second tension force.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

The present disclosure generally relates to a tong assembly for making up and breaking out a tubular connection such as a connection between two tubulars in a tubular string. The tubular strings may be made of tubulars that form risers, casings, drill pipes or other tubulars in oil and gas wells. Embodiment of the present disclosures relates to a tong assembly having a power tong, a backup tong and a load transfer assembly connected between the power tong and the backup tong. The load transfer assembly includes a torque bar and sensors, such as load cells, to monitor the torque exerted on the tubular string by the tong assembly.

Figure 1A:
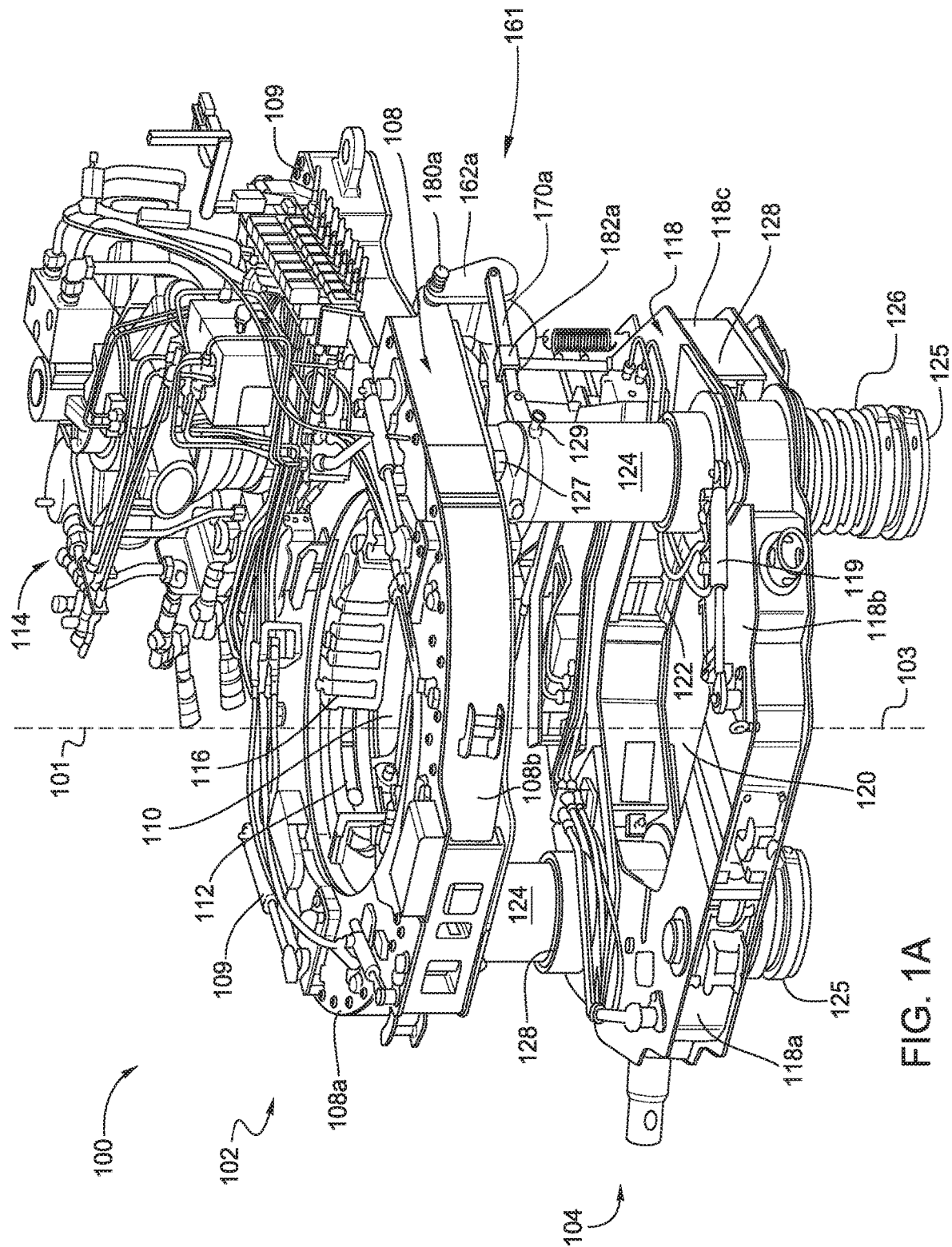
FIG. 1A is a schematic perspective view of a tong assembly according to one embodiment of the present disclosure.
Figure 1B:
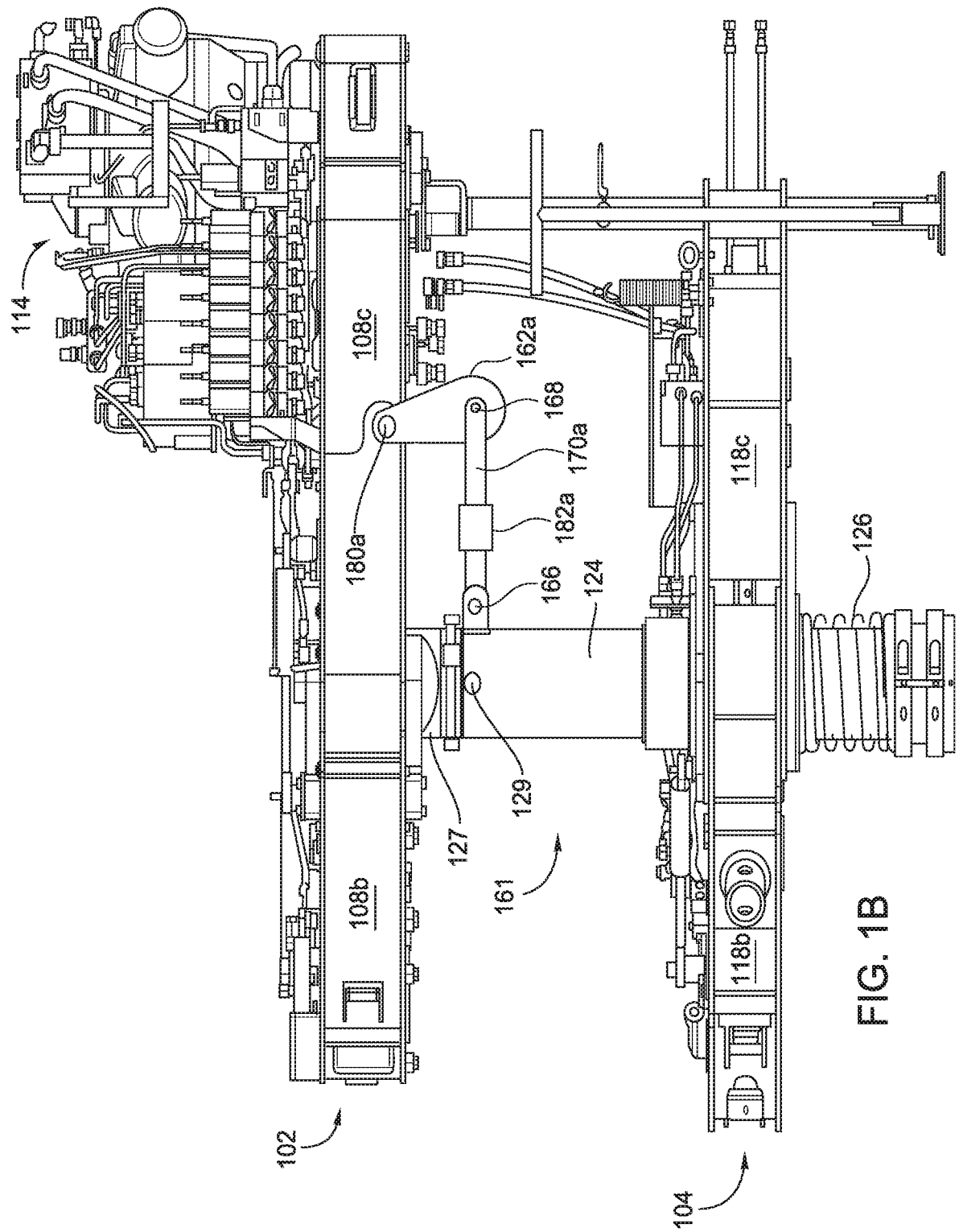
FIG. 1B is a schematic side view of the tong assembly of FIG. 1A.

FIG. 1A illustrates an embodiment of a tong assembly 100 according to one embodiment of the present disclosure. FIG. 1B is a schematic side view of the tong assembly 100. The tong assembly 100 includes a power tong 102 and a backup tong 104. In operation, the power tong 102 may be suspended from a handling tool or supported by a stand. The power tong 102 and the backup tong 104 may be connected by a load transfer assembly 161.

The power tong 102 may include a frame 108 with a central opening 110 for receiving a tubular. The frame 108 may include two or more sections movable relative to each other to open and close the central opening 110. In one embodiment, the frame 108 may include two front sections 108a, 108b and one back section 108c. The front sections 108a, 108b are connected to the back section 108 by hinges and pivotable about the back section 108c. In one embodiment, the front sections 108a, 108b may be pivoted by pistons 109.

The power tong 102 may further include a rotor 112 disposed in the frame 108. The rotor 112 may be a segmented rotor. The rotor 112 may be coupled to a motor assembly 114. Jaws 116 may be attached to an inner diameter of the rotor 112. The jaws 116 may rotate with the rotor 112 to rotate a tubular about a central axis 101 during makeup and breakout of a tubular connection. The jaws 116 may move radially relative to the frame 108 to secure and release a tubular or to accommodate tubulars of various diameters. In one embodiment, the jaws 116 may be driven using a hydraulic circuit.

The backup tong 104 may be disposed underneath the power tong 102. The backup tong 104 may include a frame 118 with a central opening 120 for receiving a tubular. The frame 118 may include two or more sections movable relative to each other to open and close the central opening 120. In one embodiment, the frame 118 may include two front sections 118a, 118b and one back section 118c. The front sections 118a, 118b are connected to the back section 118 by hinges and pivotable about the back section 118c. In one embodiment, the front sections 118a, 118b may be pivoted by pistons 119. The backup tong 104 may include jaws 122 attached to the frame 118. The jaws 122 may move radially relative to the frame 118 to secure and release a tubular or to accommodate tubular of various diameters. In one embodiment, the jaws 122 may be driven using a hydraulic circuit.

The frame 118 of the backup tong 104 may be movably coupled to support legs 124. Lower ends 125 of the support legs 124 are configured to stand a platform or other stationary planes. The support legs 124 support the backup tong 104 and prevent the backup tong 104 from rotating during operation. In one embodiment, the frame 118 has through openings for receiving the support legs 124 therein. In one embodiment, the frame 118 may include sleeves 128 for receiving the support legs 124. In one embodiment, the frame 118 may be coupled to two support legs 124 that are symmetrically positioned about a central axis 103 of the backup tong 104. In one embodiment, the central axis 103 and central axis of the two support legs 124 may be within the same plane. Each support leg 124 may include a spring member 126 disposed at lower ends 125. Weight and vertical load of the backup tong 104 may rest on the spring members 126. The spring members 126 allow the backup tong 104 to be movable along the support legs 124 thus providing structure flexibility.

Figure 1C:
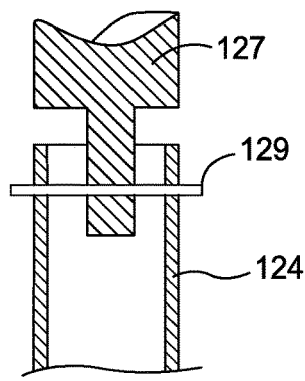
FIG. 1C is a schematic partial sectional view of a support leg of the tong assembly of FIG. 1A.

In one embodiment, the power tong 102 may include alignment posts 127 extending from a lower side of the frame 108. When the tong assembly 100 is assembled, the alignment posts 127 may be inserted into the support legs 124 so that the central axis 101 of the power tong 102 and the central axis 103 of the backup tong 104 may be substantially aligned (see FIG. 1C). The inner diameter of the support legs 124 is substantially larger than the outer diameter of the alignment posts 127 so that the power tong 102 may move relative to the backup tong 104 within a limited range without the alignment posts 127 contacting the support legs 124. When the alignment posts 127 do not contact the support legs 124, torsion and force are not transmitted between the support legs 124 and the alignment posts 127. In one embodiment, during assembly or transportation, pins 129 may be used to couple the alignment posts 127 to the support leg 124. However, during operation, the pins 129 are removed to allow relative movements between the power tong 102 and the backup tong 104 and avoid transmission of load between the alignment posts 127 and the support legs 124.

Figure 1D:
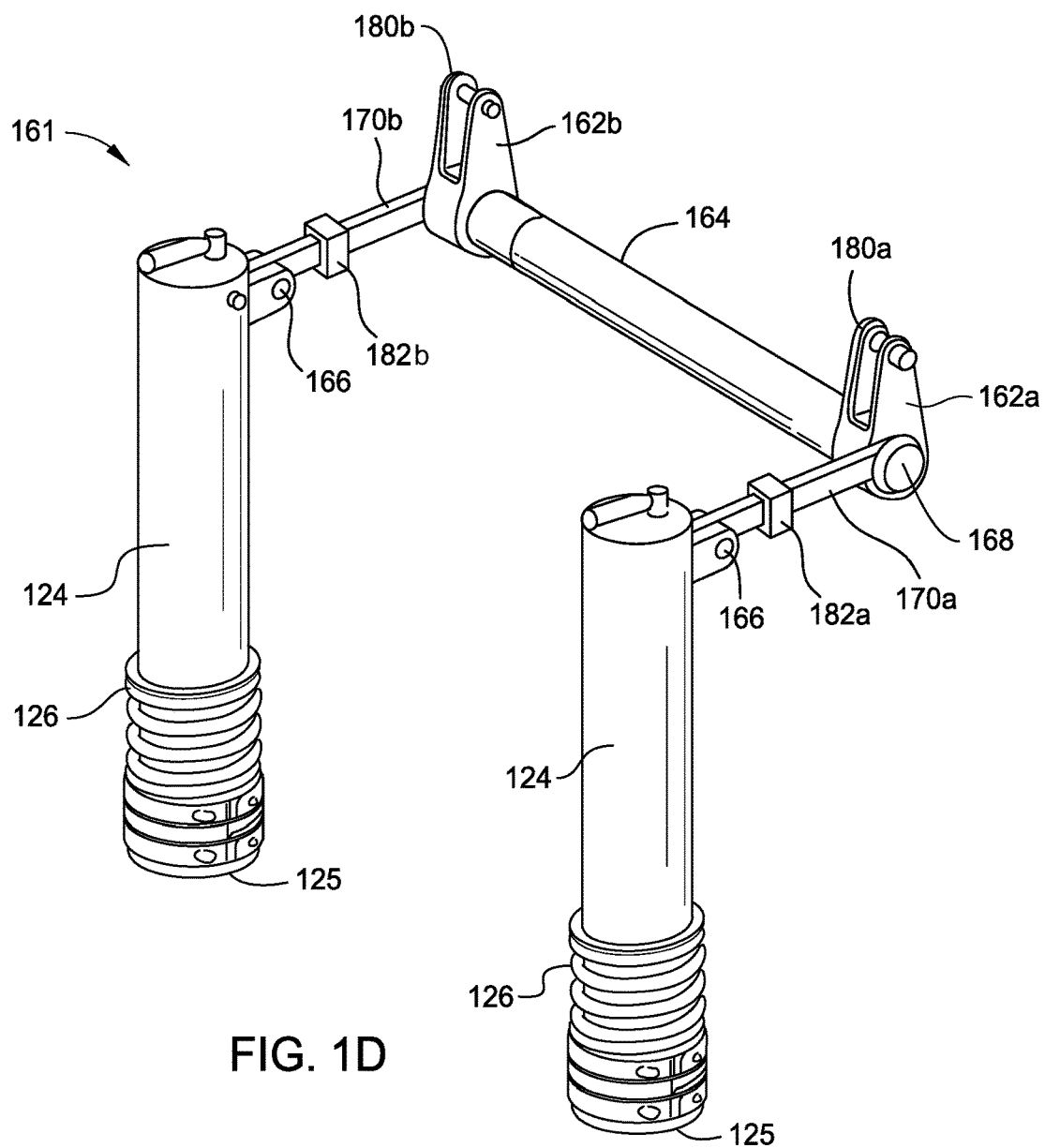
FIG. 1D schematically illustrates a load transfer assembly of the tong assembly of FIG. 1A.

The power tong 102 and the backup tong 104 are connected through the load transfer assembly 161. The load transfer assembly 161 may include two arms 162a, 162b, two links 170a, 170b, and a torque bar 164 (see FIG. 1D). The two arms 162a, 162b are coupled to the sides of the power tong 102 and extend downward from the power tong 102. The arms 162a, 162b may be pivotally coupled to the power tong 102 by pivot connections 180a, 180b, respectively. The pivot connections 180a, 180b may be located equidistant from the central axis 101. The torque bar 164 couples the lower portion of the two arms 162a, 162b. The links 170a, 170b are coupled between the support legs 124 and the arms 162a, 162b. Each link 170a, 170b is coupled to the corresponding support leg 124 by a pivot connection 166. Each link 170a, 170b is coupled to the corresponding arm 162a, 162b by a pivot connection 168.

When power tong 102 applies a torque to rotate a first tubular causing a joint between the first tubular and a second tubular held by the backup tong 104 to tighten or loosen, the load transfer assembly 161, coupled to the power tong 102 and the backup tong 104, provides reaction torques to prevent the power tong 102 from moving relative to the backup tong 104 along a horizontal plane. For example, during makeup, the torque applied by the power tong 102 creates a reaction force which, because of the torque bar 164 and the arms 162a, 162b, results in substantially equal and opposite movements being applied to the backup tong 104 via the links 170a, 170b.

According to embodiments of the present disclosure, each arm 162a, 162b includes a load cell 182a, 182b configured to measure the torque applied to the tubular connection. In one embodiment, the load cells 182a, 182b are integrated in the respective arm 162a, 162b. In another embodiment, the load cells 182a, 182b are attached to the respective arm 162a, 162b. The load cells 182a, 182b may be configured to measure data related to the force applied to a connection during makeup or breakout. In one embodiment, the load cell 182a, 182b is an electronic load cell. The load cell 182a, 182b may be configured to measure the applied force in tension or compression. In one embodiment, the first load cell 182a is configured to measure the applied force in tension during makeup, while the second load cell 182b is configured to measure the applied force in compression during makeup. During breakout, the second load cell 182b is configured to measure the applied force in tension, while the first load cell 182a is configured to measure the applied force in compression.

Figure 2:
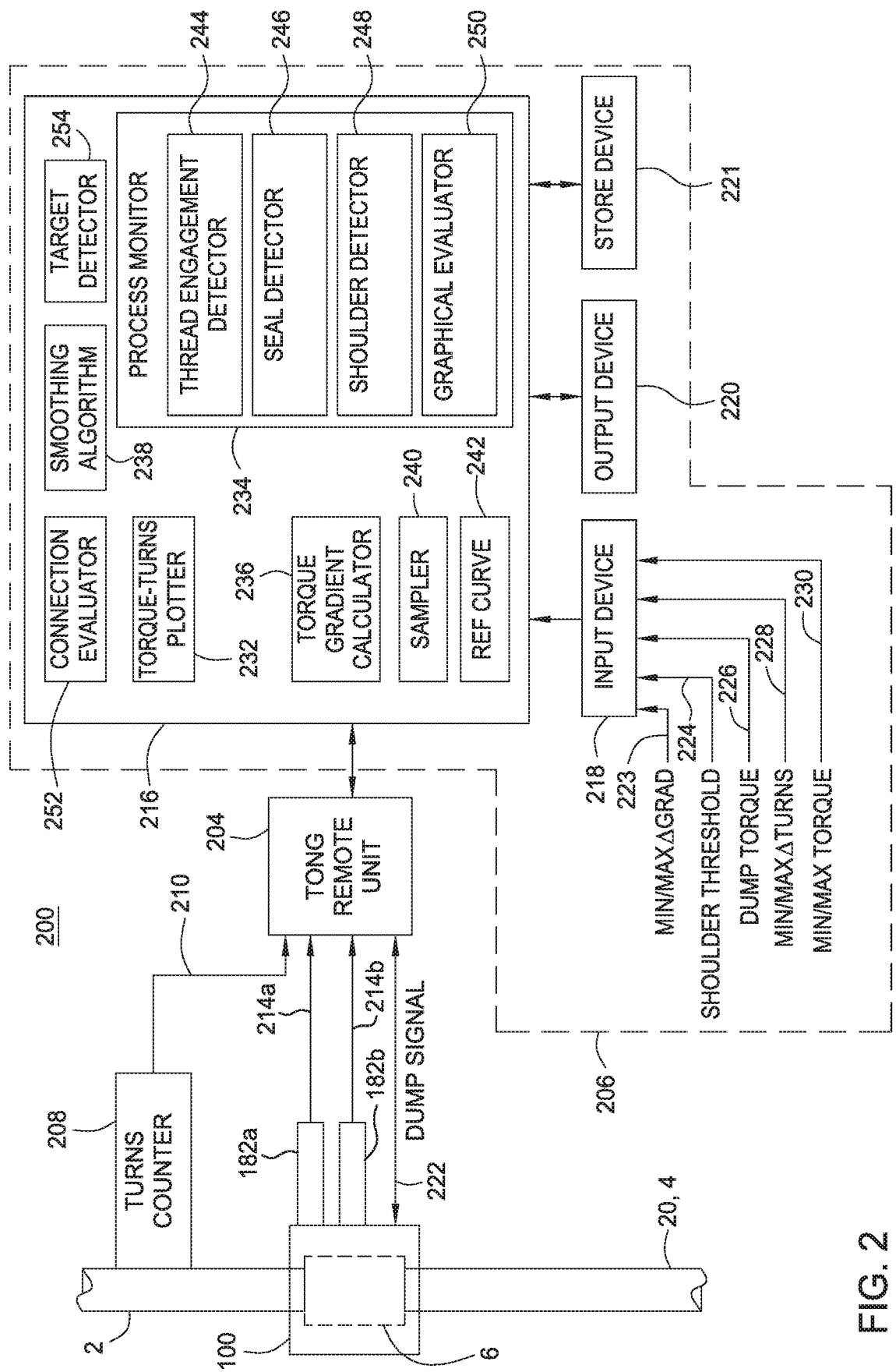
FIG. 2 is a block diagram illustrating a tubular makeup system according to embodiments disclosed herein.

FIG. 2 is a block diagram illustrating a tubular makeup system 200, according to one embodiment of the present disclosure. The tubular makeup system 200 may include the tong assembly 100, a tong remote unit (TRU) 204, a turns counter 208, load cells 182a, 182b, and the control system 206. The control system 206 may communicate with the TRU 204 via an interface. Depending on sophistication of the TRU 204, the interface may be analog or digital. Alternatively, the control system 206 may also serve as the TRU.

A programmable logic controller (PLC) 216 of the control system 206 may monitor the turns count signals 210 and torque signals 214a, 214b from the respective sensors 208, 182a, 182b and compare the measured values of these signals with predetermined values 223-230. In aspects, the PLC 216 may be any type of embedded computer device, for example, the PLC 216 may be replaced by a microcontroller unit (MCU), field programmable gate array (FPGA), application specific integrated circuit (ASIC), application specific instruction set processor (ASIP), digital signal processor (DSP), etc. The predetermined values 223-230 may be input by an technician for a particular connection. The predetermined values 223-230 may be input to the PLC 216 via an input device 218, such as a keypad or any touch sensitive display.

Illustrative predetermined values 223-230 which may be input, by a technician or otherwise, include minimum and maximum delta gradient values 223, a shoulder threshold gradient 224, a dump torque value 226, minimum and maximum delta turns values 228, minimum and maximum torque values 230, and reference curve data 242. During makeup of the connection 1, various output may be observed by an technician on an output device, such as a video monitor, which may be one of a plurality of output devices 220. The plurality of output devices 220 may also include a printer, a plotter, an alarm, or other audio equipment.

Upon the occurrence of a predefined event(s), the PLC 216 may output a dump signal 222 to the TRU 204 to automatically shut down or reduce the torque exerted by the tong assembly 100. For example, dump signal 222 may be issued in response to the measured torque value reaching the dump torque 226 and/or a bad connection.

The comparison of measured turn count values and torque values with respect to predetermined values is performed by one or more functional units of the PLC 216. The functional units may generally be implemented as hardware, software or a combination thereof. The functional units may include one or more of a torque-turns plotter algorithm 232, a process monitor 234, a torque gradient calculator 236, a smoothing algorithm 238, a sampler 240, a database 242 of reference curves, a connection evaluator 252, and a target detector 254. The process monitor 234 may include one or more of a thread engagement detection algorithm 244, a seal detection algorithm 246, a shoulder detection algorithm 248, and a graphical evaluator algorithm 250. Alternatively, the functional units may be performed by a single unit. As such, the functional units may be considered logical representations, rather than well-defined and individually distinguishable components of software or hardware.

In operation, one of the threaded members (e.g., tubular 2 and coupling 6) is rotated by the power tong 102 while the other tubular 4 is held by the backup tong 104. The applied torque and rotation are measured at regular intervals throughout the makeup. Depending on whether it is makeup or breakout operation, the tong remote unit 204 will select the appropriate load cell 182a, 182b for measuring the torque value. The selected load cell 182a, 182b will measure the tension force acting on the link 170a, 170b. For example, if it is a makeup process, the tong remote unit 204 will select the first load cell 170a, which will experience a tension force since the makeup torque is applied clockwise. In turn, the measured force may be used to calculate the applied torque by the control system 206 or TRU 204. If it is a breakout process, then the tong remote unit 204 will select the second load cell 182b, which will experience a tension force since the breakout torque is applied counterclockwise. In one embodiment, the TRU 204 will select the load cell 182a, 182b based on the input by the technician, such as a makeup or breakout operation. For example, the technician may indicate the type of operation by operating a joystock of the TRU 204. In another embodiment, the TRU 204 may select the load cell 182a, 182b based on the measured value of the turns counter 208. For example, a positive turns value by the turns counter 208 will indicate a makeup operation, in which case the TRU 204 will select the first load cell 182a. A negative turns value will indicate a breakout process, in which case the TRU 204 will select the second load cell 182b.

The frequency with which torque and rotation are measured may be specified by the sampler 240. The sampler 240 may be configurable, so that a technician may input a desired sampling frequency. The torque and rotation values may be stored as a paired set in a buffer area of memory. Further, the rate of change of torque with respect to rotation (hereinafter "torque gradient") may be calculated for each paired set of measurements by the torque gradient calculator 236. Optionally, the compression force experienced by the link 170b may be measured by the second load cell 182b and stored with the pair set of measurements. The smoothing algorithm 238 may operate to smooth the torque-turns curve 50 and/or torque gradient curve 50a (e.g., by way of a running average). These values (torque, rotation, and torque gradient) may then be plotted by the plotter 232 for display on the output device 220.

The values (torque, rotation, and torque gradient) may then be compared by the connection evaluator 252, either continuously or at selected events, with predetermined values, such as the values 223-230. Based on the comparison of the measured and/or calculated values with the predefined values 223-230, the process monitor 234 may determine the occurrence of various events and the connection evaluator 252 may determine whether to continue rotation or abort the makeup. The thread engagement detection algorithm 244 may monitor for thread engagement of the tubulars 2, 4. Upon detection of thread engagement a first marker is stored. The marker may be quantified, for example, by time, rotation, torque, the torque gradient, or a combination of any such quantifications. During continued rotation, the seal detection algorithm 246 monitors for the seal condition. This may be accomplished by comparing the calculated torque gradient with a predetermined threshold seal condition value. A second marker indicating the seal condition may be stored if/when the seal condition is detected. At this point, the torque value at the seal condition may be evaluated by the connection evaluator 252.

For example, a determination may be made as to whether the turns value and/or torque value are within specified limits. The specified limits may be predetermined, or based off of a value measured during makeup. If the connection evaluator 252 determines a bad connection, rotation may be terminated. Otherwise, rotation continues and the shoulder detection algorithm 248 monitors for the shoulder position. This may be accomplished by comparing the calculated torque gradient with the shoulder threshold gradient 224. When the shoulder position is detected, a third marker indicating the shoulder position is stored. The connection evaluator 252 may then determine whether the torque value at the shoulder position is acceptable by comparing to the respective input torque values 230.

Alternatively, a delta turns value may be entered instead of the dump torque 226. The target detector 254 may then calculate a target turns value using the shoulder turns and the delta turns value (target turns equals shoulder turns plus delta turns).

During one or more steps of the torque monitoring process, the connection evaluator 252 may verify the torque measured by the first load cell 182a. For example, during makeup, the link 170b experiences a compressive force, which may be measured by the second load cell 182b. The torque value derived from the compression measurement at the second load cell 182b may be compared to the torque value of the first load cell 182. If the torque value measured by the second load cell 182*b* is determined to be within 20% of the torque value measured by the first load cell 182*a*, then the connection evaluator 252 will allow the makeup to continue. Otherwise, the makeup process may be stopped. In another example, the makeup process may continue if the torque value of the second load cell 182*b* is within 15%, within 10%, or within 5% of the torque value measured by the first load cell 182*a*. If a breakout operation is being performed, then the torque value from the first load cell 182*a* may be used to verify the torque value from the second load cell 182*b*.

In another embodiment, during an operation, the tong assembly 100 is first moved to the location of the tubular string to be operated. The tong assembly 100 may be moved using an overhead handling tool or a track on the platform. The frames 108, 118 of the power tong 102 and the backup tong 104 may be in the open position to receive the tubular string in the openings 110, 120. For example, the front sections 108*a*, 108*b* and front sections 118*a*, 118*b* may be pivoted open while the tong assembly 100 is being moved. Once the tong assembly 100 is in position, i.e. the central axis 101 of the tong assembly 100 aligns with longitudinal axis of the tubular string. The front sections 108*a*, 108*b* and front sections 118*a*, 118*b* are then closed so that the jaws 116 and the jaws 122 may secure the tubular string. When the tong assembly 100 is in the position for making up or breaking out a connection, the tubular string is secured by the jaws 122 of the backup tong 104 and the tubular section to be joined or removed is secured by the jaws 116 of the power tong 102.

To makeup the joint, the first tubular is generally grounded to the work floor, for example by the slips for the work floor. The jaws 122 of the backup tong 104 clamp to the first tubular so that the backup tong 104 would not rotate while the jaws 116 of the power tong 102 clamp to the second tubular and rotate the second tubular relative to the first tubular.

The power tong 102 rotates the second tubular clockwise during makeup. The torque generated by the clockwise rotation of the jaws 116 of the power tong 102 is transferred to the arms 162*a*, 162*b* at the pivot connections 180*a*, 180*b*. The forces acting on the arms 162*a*, 162*b* are parallel to each other and along opposite directions. The amount of the forces depends on the value of the torque and the distance between the pivot connections 180*a*, 180*b* and the central axis 101. The forces are transferred along the paths of the arms 162*a*, 162*b*, the links 170*a*, 170*b*, and the support legs 124 to the backup tong 104. The stationary backup tong 104 exerts reactions forces along the same paths to the power tong 102 to prevent the power tong 102 from rotating. The force acting on link 170*a* is a tension force, and the force acting on link 170*b* is a compression force.

For makeup, the first load cell 182*a* is selected to measure the torque value applied by the power tong 102. The force measurements by the load cell 182*a* are used to monitor the torque applied to the tubular connection during operation. For example, the force measurements are correlated to torque values by the tong control system. Monitoring the torque measurements of the load cell 182*a* may prevent the tubular joints from being too loose or too tight. For example, an upper torque and a lower torque may be used to control the tightness of the joints. For example, during makeup, the torque measurement of the load cell 182*a* may be monitored to continuously rotate the power tong 102 when the measurement is lower than the lower torque and stop the rotation of the power tong 102 or reverse the rotation of the power tong 102 when the torque measurement by the load cell 182*a* reaches or exceeds the upper torque. Additionally, the torque measurement of the load cell 182*a* may also be used to achieve uniform tightness among the joints in a tubular string.

The torque measurement of the second load cell 182*b* may be used to verify the torque measured by the first load cell 182*a*. For example, if the torque measurement of the second load cell 182*b* is within 15% of the first load cell 182*a*, then the makeup operation may continue.

To breakout the joint, the first tubular is generally grounded to the work floor, for example by the slips for the work floor. The jaws 122 of the backup tong 104 clamp to the first tubular so that the backup tong 104 would not rotate while the jaws 116 of the power tong 102 clamp to the second tubular and rotate the second tubular relative to the first tubular.

The power tong 102 rotates the second tubular counter-clockwise during makeup. The torque generated by the counterclockwise rotation of the jaws 116 of the power tong 102 is transferred to the arms 162*a*, 162*b* at the pivot connections 180*a*, 180*b*. The forces acting on the arms 162*a*, 162*b* are parallel to each other and along opposite directions. The amount of the forces depends on the value of the torque and the distance between the pivot connections 180*a*, 180*b* and the central axis 101. The forces are transferred along the paths of the arms 162*a*, 162*b*, the links 170*a*, 170*b*, and the support legs 124 to the backup tong 104. The stationary backup tong 104 exerts reactions forces along the same paths to the power tong 102 to prevent the power tong 102 from rotating. The force acting on link 170*b* is a tension force, and the force acting on link 170*a* is a compression force.

For breakout, the second load cell 182*b* is selected to measure the torque value applied by the power tong 102. The force measurements by the second load cell 182*b* are used to monitor the torque applied to the tubular connection during operation. For example, the force measurements are correlated to torque values by the tong control system. Monitoring the torque measurements of the second load cell 182*b* may prevent the tubular joints from being too loose or too tight. For example, an upper torque and a lower torque may be used to control the tightness of the joints. For example, during makeup, the torque measurement of the second load cell 182*b* may be monitored to continuously rotate the power tong 102 when the measurement is lower than the lower torque and stop the rotation of the power tong 102 or reverse the rotation of the power tong 102 when the torque measurement by the second load cell 182*b* reach or exceed the upper torque. Additionally, the torque measurement of the second load cell 182*b* may also be used to achieve uniform tightness among the joints in a tubular string.

The torque measurement of the first load cell 182*a* may be used to verify the torque measured by the second load cell 182*b*. For example, if the torque measurement of the first load cell 182*a* is within 15% of the second load cell 182*b*, then the makeup operation may continue.

In one embodiment, a tubular handling apparatus includes a power tong; a backup tong; and a load transfer assembly connected between the power tong and the backup tong. The load transfer assembly includes a first link having a first load cell positioned to measure a first force exerted on the first link; and a second link having a second load cell positioned to measure a second force exerted on the second link. The tubular handling apparatus may also include a tong control assembly configured to select the first load cell for use in a tubular makeup operation and to select the second load cell for use in a tubular breakout operation.

In one or more embodiments described herein, the first force exerted on the first link during the tubular makeup process is a tension force.

In one or more embodiments described herein, the second force exerted on the second link during the tubular breakout process is a tension force.

In one or more embodiments described herein, the load transfer assembly further includes a first arm coupled to the first link and the power tong; and a second arm coupled to the second link and the power tong.

In one or more embodiments described herein, the apparatus includes a torque bar coupled to the first arm and the second arm.

In one or more embodiments described herein, the first load cell is disposed along the longitudinal axis of the first link.

In one or more embodiments described herein, the first force and the second force are in opposite directions.

In another embodiment, a method of measuring a torque applied between a first tubular and a second tubular includes gripping the first tubular using a power tong; gripping the second tubular using a backup tong; applying a torque to the first tubular using a power tong; measuring the torque using a first load cell if the first tubular is being connected to the second tubular; and measuring the torque using a second load cell if the first tubular is being disconnected from the second tubular.

In another embodiment, a method of measuring a torque applied between a first tubular and a second tubular includes gripping the first tubular using a power tong; gripping the second tubular using a backup tong; applying a torque to the first tubular using a power tong; measuring a tension force using a first load cell; determining the torque applied using the measured tension force; measuring a compressive force using a second load cell; and verifying the torque applied using the compressive force.

In another embodiment, a method of measuring a torque applied by a tong assembly includes applying a clockwise torque using a power tong of the tong assembly; measuring a first tension force using a first load cell; determining the clockwise torque using the first tension force; applying a counterclockwise torque using the power tong; measuring a second tension force using a first load cell; and determining the counterclockwise torque using the second tension force.

In one or more embodiments described herein, the first load cell is configured to measure a tension force while the first tubular is being connected to the second tubular, and measuring the torque comprises calculating the torque based on the tension force measured.

In one or more embodiments described herein, the second load cell is configured to measure a tension force while the first tubular is being disconnected from the second tubular, and measuring the torque comprises calculating the torque based on the tension force measured.

In one or more embodiments described herein, the method includes verifying the torque using the second load cell.

In one or more embodiments described herein, the second load cell is configured to measure a compression force while the first tubular is being connected to the second tubular, and the method includes calculating a second torque based on the compression force measured; and comparing the torque measured to the second torque.

In one or more embodiments described herein, the method includes determining whether the first tubular is being connected to the second tubular.

In one or more embodiments described herein, the method includes selecting the first load cell or the second load cell based on the determination.

In one or more embodiments described herein, the method includes measuring a turns value to determine whether the first tubular is being connected to the second tubular.

While the foregoing is directed to embodiments of the present disclosure, other and further embodiments may be devised without departing from the basic scope thereof, and the scope of the present disclosure is determined by the claims that follow.

The invention claimed is:

1. A tubular handling apparatus, comprising:
   a power tong;
   a backup tong;
   a load transfer assembly connected between the power tong and the backup tong, wherein the load transfer assembly includes:
      a first link having a first load cell positioned to measure a first force exerted on the first link; and
      a second link having a second load cell positioned to measure a second force exerted on the second link; and
   a tong control assembly configured to select the first load cell for use in a tubular makeup operation and to select the second load cell for use in a tubular breakout operation, the tong control assembly further configured to measure both forces in makeup and breakout and to compare the measurements against each other.

2. The apparatus of claim 1, wherein the first force exerted on the first link during the tubular makeup process is a tension force.

3. The apparatus of claim 1, wherein the second force exerted on the second link during the tubular breakout process is a tension force.

4. The apparatus of claim 1, wherein the load transfer assembly further comprises:
   a first arm coupled to the first link and the power tong; and
   a second arm coupled to the second link and the power tong.

5. The apparatus of claim 4, further comprising a torque bar coupled to the first arm and the second arm.

6. The apparatus of claim 1, wherein the first load cell is disposed along the longitudinal axis of the first link.

7. The apparatus of claim 1, wherein the first force and the second force are in opposite directions.

8. The apparatus of claim 1, wherein the first link and the first load cell are positioned so that the first load cell is in tension during the tubular makeup operation;
   wherein tong control assembly is configured to determine a first torque measurement using the first force during the tubular makeup operation and is configured to rotate the power tong when the first torque measurement is less than an upper torque value.

9. The apparatus of claim 8 wherein tong control assembly is configured to stop the rotation of the power tong when the first torque measurement reaches or exceeds the upper torque value.

10. A method of measuring a torque applied between a first tubular and a second tubular, comprising:
   gripping the first tubular using a power tong;
   gripping the second tubular using a backup tong;
   applying a torque to the first tubular using a power tong;
   measuring the torque using a first load cell if the first tubular is being connected to the second tubular;

measuring the torque using a second load cell if the first tubular is being disconnected from the second tubular, and verifying the torque using the second load cell if the first tubular is being connected and verifying the torque using the first load cell if the first tubular is being disconnected.

11. The method of claim 10, wherein the first load cell is configured to measure a tension force while the first tubular is being connected to the second tubular, and measuring the torque comprises calculating the torque based on the tension force measured.

12. The method of claim 10, wherein the second load cell is configured to measure a tension force while the first tubular is being disconnected from the second tubular, and measuring the torque comprises calculating the torque based on the tension force measured.

13. The method of claim 8, wherein the second load cell is configured to measure a compression force while the first tubular is being connected to the second tubular, and the method includes:

calculating a second torque based on the compression force measured; and comparing the torque measured to the second torque.

14. The method of claim 10, further comprising determining whether the first tubular is being connected to the second tubular.

15. The method of claim 14, further comprising selecting the first load cell or the second load cell based on the determination.

16. The method of claim 10, further comprising measuring a turns value to determine whether the first tubular is being connected to the second tubular.

17. The method of claim 10, further comprising:

rotating the power tong to connect the first tubular to the second tubular when the torque measured is less than an upper torque value.

18. The method of claim 17, further comprising:

stopping the rotation of the power tong when the torque measured reaches or exceeds the upper torque value.

* * * * *

UNITED STATES PATENT AND TRADEMARK OFFICE
CERTIFICATE OF CORRECTION

| | |
|---|---|
| PATENT NO. | : 10,605,016 B2 |
| APPLICATION NO. | : 15/815590 |
| DATED | : March 31, 2020 |
| INVENTOR(S) | : Bjoern Thiemann |

It is certified that error appears in the above-identified patent and that said Letters Patent is hereby corrected as shown below:

In the Claims

Claim 13, Column 11, Line 18, delete "8" and insert in place thereof --12--.

Signed and Sealed this
Eighteenth Day of July, 2023

Katherine Kelly Vidal
*Director of the United States Patent and Trademark Office*